United States Patent
Leclair

(10) Patent No.: US 7,330,519 B2
(45) Date of Patent: Feb. 12, 2008

(54) METHOD FOR DECODING LINEAR SPACE-TIME CODES IN A MULTIPLE-ANTENNA WIRELESS TRANSMISSION SYSTEM AND DECODER THEREFOR

(75) Inventor: Philippe Leclair, Verrieres le Buisson (FR)

(73) Assignee: Comsis, Paris (FR)

( * ) Notice: Subject to any disclaimer, the term of this patent is extended or adjusted under 35 U.S.C. 154(b) by 519 days.

(21) Appl. No.: 10/517,026

(22) PCT Filed: Jun. 13, 2003

(86) PCT No.: PCT/FR03/01783

§ 371 (c)(1),
(2), (4) Date: Dec. 7, 2004

(87) PCT Pub. No.: WO03/107582

PCT Pub. Date: Dec. 24, 2003

(65) Prior Publication Data

US 2006/0050804 A1    Mar. 9, 2006

(30) Foreign Application Priority Data

Jun. 14, 2002  (FR) ................................... 02 07331

(51) Int. Cl.
*H04L 27/08*    (2006.01)
(52) U.S. Cl. ....................... 375/316; 375/340; 375/346
(58) Field of Classification Search ............... 375/316, 375/295, 340, 346
See application file for complete search history.

(56) References Cited

U.S. PATENT DOCUMENTS 4,177,357 A    12/1979   Mayer (Continued)

FOREIGN PATENT DOCUMENTS

FR    2 730 080    8/1996

OTHER PUBLICATIONS

Golden, G.D. et al. *Detection algorithm and initial laboratory results using laboratory results using V-BLAST space-time communication architecture*, Electronics Letters, vol. 35, No. 1, Jan. 7, 1999, 2pp.

(Continued)

*Primary Examiner*—Chieh M. Fan
*Assistant Examiner*—Jason M. Perilla
(74) *Attorney, Agent, or Firm*—Greer, Burns & Crain, Ltd.

(57) ABSTRACT

An iterative method and a decoder for decoding space-time codes in a communication system with multiple transmission and reception antennae, strikes a compromise between techniques based on interference cancellation algorithms such as BLAST, which show faulty performance concerning error rate based on signal-to-noise ratio and techniques based on maximum likelihood algorithms which are optimal in terms of performance, but highly complex in implantation such as the sphere decoder. Therefor the method includes using a first matrix product between the received signal (Y) and a shaping matrix ($B^i$), and a second matrix product between a subtraction matrix ($D^i$) and the vector of the estimated symbols ($S^{i-i}$) during the preceding iteration. The estimated symbols during the current iteration are generated by a subtractor (9) receiving the results ($r^i \cdot z^i$) of the two matrix products. The role of the matrix $D^i$ is to subtract from the current information symbol $S^i$ the interference caused by the other information symbols.

13 Claims, 2 Drawing Sheets

U.S. PATENT DOCUMENTS

| | | |
|---|---|---|
| 6,002,996 A | 12/1999 | Burks et al. |
| 6,178,196 B1 | 1/2001 | Naguib et al. |
| 6,999,472 B2 * | 2/2006 | Hamalainen et al. ....... 370/468 |
| 2005/0094742 A1 * | 5/2005 | Yee ............................ 375/267 |
| 2005/0204273 A1 * | 9/2005 | Jeong et al. ................ 714/801 |

OTHER PUBLICATIONS

Damen, O. et al., *Lattice Code Decoder for Space-Time Codes*. IEEE Communications Letters, vol. 4, No. 5, May 2000, pp. 161-163.

* cited by examiner

METHOD FOR DECODING LINEAR SPACE-TIME CODES IN A MULTIPLE-ANTENNA WIRELESS TRANSMISSION SYSTEM AND DECODER THEREFOR

The present invention relates to a method for decoding linear space-time codes in a multiple-antenna wireless transmission system. It also relates to a decoder implementing this method.

The invention is found to be particularly useful in the field of radio transmission or broadcasting of digital data, or sampled analog data, in particular in the case of transmission with mobiles or more generally, in the case of a local or non-local wireless network. More precisely, the invention can be used in particular when high-throughput wireless transmissions are to be made. A first category of use relates to cellular communication systems with mobiles such as the UMTS for example. A second category of use relates to local wireless networks. A third category of use is that of future ad hoc networks.

Existing and future wireless communication systems require a high quality of transmission for constantly increasing throughputs. In fact, these systems have as an objective the establishing of services including high quality data and video transmission channels.

There are numerous constraints linked with multi-path propagation. This multiple propagation is due to the fact that a radio signal reaches an antenna by several paths via reflections on the ionosphere and on terrestrial objects such as mountains and buildings for example. The effects of this multiple propagation are constructive and destructive interferences as well as phase shifts of the signals transmitted.

In order to develop a reliable and robust communication system, space, time and frequency diversity techniques are used. Space diversity consists in particular of an arrangement of several transmit and/or receive antennae. When time diversity is added, a space-time diversity is created, requiring space-time coding on transmission, as well as space-time decoding on reception. It is known that space-time codes make it possible to increase the throughputs of information transmitted for an equal quality of service.

High-efficiency linear space-time codes have already been decoded by decoding algorithms which can be classified in two families:
- interference cancellation algorithms such as BLAST ("Bell Laboratories Layered Space-Time") which have poor performances in terms of error rates as a function of the signal-to-noise ratio.
- maximum likelihood algorithms which are optimal in terms of performance, but with a high installation complexity such as the sphere decoder.

The document U.S. Pat. No. 6,178,196 (SESHADRI et al.) is known, which describes a multiple antenna system combining interference cancellation decoding with maximum likelihood decoding. The system described has the purpose of isolating the signals originating from a given station, assuming that the symbols of the signals transmitted by another station are correctly determined during a preliminary estimation.

An optimal decoder for high-yield linear space-time codes has been found by Damen, Chkeif and Belfiore (O. Damen, A. Chkeif and J.-C. Belfiore, "Lattice Code Decoder for Space-Time Codes," *IEEE Communications Letters*, May 2000). Its performances exceed those possible with the "BLAST" decoder (G. D. Golden, G. J. Foschini, R. A. Valenzuela, P. W. Wolniasky, "Detection Algorithm and Initial Laboratory Results using the V-BLAST Space-Time Communication Architecture," *IEEE Electronics Letters*, Jan. 7, 1999). However, it suffers from three problems closely linked to its implementation:

1. It is of a fairly high complexity, which makes its high throughput implementation very problematical.
2. Its complexity strongly depends on the radius of the sphere chosen. The code word decoded must in fact be found in this sphere if the decoding is not to fail, and moreover, there must not be many other code words to be found in this same sphere, as otherwise the decoding complexity can further increase very considerably.
3. Finally, the decoding complexity depends very strongly on the signal-to-noise ratio and also the right choice of sphere. The sphere choice algorithms are themselves fairly complex. It is therefore seen to be necessary to find another decoding algorithm which does not suffer from this kind of problems.

The present invention has the purpose of developing a new linear space-time decoder realizing a compromise between the interference cancellation technique and the maximum likelihood technique. The invention aims at performances very close to the maximum likelihood technique with simplified implementation compared with that of the interference cancellation algorithms.

The abovementioned objectives are achieved with an iterative method for decoding a set of N sampled signals in a space-time communication system with M transmit antennae and N receive antennae The N signals are processed by intervals of time T corresponding to the time length of the linear space-time code associated with the transmission signals. In each time interval T, the sampled signals received are represented in the form of a signal matrix Y.

$Y=(y_{ij})$ $i=1, \ldots, N$ $j=1, \ldots, T$ can also be expressed in the form $Y=H\,X+W$     (1)

in which X is the space-time code word transmitted and is represented by a rectangular matrix with M lines and T columns, H is the channel matrix and is represented by a rectangular matrix with N lines and M columns, and finally W is noise, represented by a rectangular matrix with N lines and T columns.

It is therefore seen that the line changes correspond to the antenna changes whereas the column changes correspond to changes in the sampling times. In this model, the coefficients of the matrix X depend linearly on the information symbols to be transmitted, i.e. the coefficients of the matrix transmitted, $x_{ij}$ with i ranging from 1 to M and j ranging from 1 to T are written in the form $$x_{ij} = \sum_{p=1}^{M} \sum_{q=1}^{T} g_{ijpq} s_{pq}$$

with $s_{pq}$ being the information symbols and $g_{ijpq}$ being coefficients which depend on the code chosen. Thus, any linear space-time code, i.e. such that the words transmitted X have their coefficients $x_{ij}$, which can be expressed in the preceding form, can be decoded by the method according to the invention.

A description will now be given of a vectorized model on which the method according to the invention can be used.

Instead of working with matrices, it is possible to vectorize the expression of the signal received in equation (1) and write $$Y = \text{vec}(Y) = H\ X + W \quad (2)$$

With x=vec (X)=G S, G has the dimension (MT,MT)

$$\text{And } H = \begin{bmatrix} H & & & 0 \\ & \cdot & & \\ & & \cdot & \\ & & & \cdot \\ 0 & & & H \end{bmatrix}$$

H is a matrix (NT,MT) having on the diagonal T times the matrix H, the other coefficients being zero.

Equation (2) is then equivalent to equation (1) and constitutes its vectorized version. It is on this version that the decoder of the invention will be used. It is now sufficient to define the extended channel matrix

C=H G which will be used hereafter. The vectorized version of the received signal can therefore be rewritten

Y=C S+W where Y is a column vector with NT components, C is a matrix NT×MT, S is the symbols column vector with MT components and W is the noise column vector with NT components.

The iterative decoding method according to the present invention makes it possible to obtain an estimation of the symbols of the signals transmitted. This method is used in particular for N greater than or equal to M. According to the invention, it comprises the following steps:

Pre-processing of the vector Y in order to maximize the signal to noise+interference ratio in order to obtain a signal $\tilde{r}^l$.

Subtraction from the signal $\tilde{r}^l$ of a signal $\hat{z}^l$ by means of a subtractor, the signal $\hat{z}^l$ being obtained by reconstruction post-processing of the interference between symbols from the symbols estimated during the preceding iteration;

Detection of the signal generated by the subtractor in order to obtain, for the iteration in progress, an estimation of the symbols of the signals transmitted.

The pre-processing step can be carried out by operating a matrix multiplication between the signal vector Y and a matrix B, the matrix B being updated at each iteration.

The post-processing step can also be carried out by operating a matrix multiplication between the vector of the symbols estimated during the preceding iteration and a matrix D, the matrix D being updated at each iteration.

According to the invention, for each iteration, a standardized correlation coefficient ρ is calculated, the updating of a matrix being achieved by determining new coefficients of the matrix as a function of the correlation coefficient obtained for the preceding iteration.

According to a preferred embodiment of the invention, the N signals are processed by time intervals T corresponding to the time length of the linear space-time code associated with the transmission signals, and the pre-processing step involves the matrix B in order to maximize the signal to noise+interference ratio, the transfer function of which is:

$$B^l = \text{Diag}\left(\frac{1}{\rho_{l-1}^2 A_i^l + \frac{N_0}{E_s}}\right) 1 \leq i \leq MT. C^H V^l$$

$$\text{with } V^l = \left[\frac{1-\rho_{l-1}^2}{\frac{N_0}{E_s}} \cdot C \cdot C^H + Id_N\right]^{-1}; A^l = \text{diag}(C^H \cdot V^l \cdot C);$$

l: iteration index; ρ: standardized correlation coefficient between the real symbols and the estimated symbols; $N_0$: noise variance; Es: mean energy of a symbol; C: extended channel matrix.

Similarly, the post-processing step can involve a matrix D for the reconstruction of the interference between symbols, the transfer function of which is:

$$D^l = B^l \cdot C \cdot \rho_{l-1} - \text{Diag}\left(\frac{1}{\rho_{l-1}^2 A_i^l + \frac{N_0}{E_s}}\right) 1 \leq i \leq MT$$

Before the first iteration, we have no information on the symbols. The matrix B has the role of maximizing the signal/(noise+interference) ratio. The vector z is void. A representation of the vector of the symbols S can be such that the $k^{th}$ symbol is:

$S_k(\text{received}) = S_k(\text{transmitted}) + \Sigma a_i S_i(\text{transmitted}) + \text{noise}$ At the second iteration, the matrix B still maximizes the SINR ratio. The matrix D will mimic the interference between symbols, i.e. $\Sigma a_i S_i$(transmitted) during the preceding iteration at the level of the signal r leaving the matrix B. The subtractor makes it possible to subtract this interference.

At the last iteration, it is assumed that the symbols are correctly estimated, i.e. that D makes it possible to reconstruct all the interference, such that it is estimated that:

$S_k(\text{received}) = S_k(\text{transmitted}) + \text{noise}$

The invention is a decoder which can be adapted to linear space-time codes, whatever they are, i.e. it makes it possible to decode any code such that the sequences transmitted are written as a linear combination of the information symbols.

It can be noted that the matrices B and D depend on the correlation coefficient which is different for each iteration. According to an advantageous characteristic of the invention, in order to determine the correlation coefficient $\rho^l$, at each iteration:

the signal to interference ratio SINR is calculated at the threshold detector's input using the following formula:

$$SINR^l = \left[\frac{1}{\xi^l e^{\xi^l} E_1(\xi^l)} - 1\right] \frac{1}{1-\rho_{l-1}^2}$$

with the integral exponential $$E_1(s) = \int_s^{+\infty} \frac{e^{-t}}{t} dt \text{ and } \xi^l = \frac{\varsigma}{1-\rho_{l-1}^2}; \varsigma = \frac{N_0}{NE_s}$$

the symbol error probability Pr, for example at the threshold detector's input, is calculated from the signal to interference ratio $SINR^l$; and the correlation coefficient $\rho^l$ is then calculated from the symbol error probability Pr. In order to do this, it is possible to use a standard formula producing the correlation coefficient as a function of the symbol error probability, this formula depending on the modulation used in the transmission.

This results in the most precise possible approximation to the correlation coefficient $\rho^l$.

In subsequent experiments, four iterations sufficed to obtain very good results. But it is also possible to define a minimum value (threshold value) of the correlation coefficient for which the iterations are interrupted. This coefficient is essentially a function of H, which can be estimated in standard manner, and of the variance $N_0$. Consequently, all the values of the correlation coefficient $\rho$, as well as the values of the matrices B and D (for all of the iterations) can be calculated before the first iteration. They can therefore be stored before the first iteration in a memory in order to then be brought out for each iteration.

Preferably, it is assumed that $\rho^0=0$.

Moreover, in order to calculate the symbol error probability Pr, it can be assumed that the total noise is Gaussian and that it is possible to use the formula corresponding to the constellation of a linear modulation, for example $$Q\left(\sqrt{\frac{2E_b}{N_0}}\right)$$

for the BPSK ("Binary Phase Shift Keying") system or to use tables indicating the error probability as a function of the signal to noise ratio. In fact, depending on the complexity of the symbol error probability it can be useful to directly tabulate the formula.

Advantageously, in order to calculate the correlation coefficient $\rho^l$ from the symbol error probability Pr, it can be assumed that when there is an error, the threshold detector detects one of the closest neighbours to the symbol transmitted.

By way of example, at the final iteration, it is possible to introduce the signal leaving the subtractor into a soft-entry decoder.

According to a preferred method of implementation of the invention, the information symbols can be elements of a constellation originating from a quadrature amplitude modulation, or QAM.

According to another feature of the invention, a space-time decoder is proposed for decoding a signal vector Y obtained from N sampled signals in a space-time communication system with M transmit antennae and N receive antennae, with N greater than or equal to M, with a view to obtaining an estimation of the symbols of the signals transmitted. According to the invention, this decoder comprises:

a pre-processing module of the vector Y for maximizing the signal to noise+interference ratio in order to obtain a signal $\tilde{r}^l$, a subtractor for subtracting a signal $\hat{x}^l$ from the signal $\tilde{r}^l$, a post-processing module for the reconstruction of the interference between symbols from the symbols estimated during the preceding iteration in order to generate the signal $\hat{z}^l$, a threshold detector for detecting the signal generated by the subtractor in order to obtain, for the iteration in progress, an estimation of the symbols of the signals transmitted.

These pre-processing and post-processing modules can be matrices, B and D, according to the formulae indicated previously.

Other advantages and characteristics of the invention will become apparent on examining the detailed description of an implementation embodiment which is in no way limitative, and the attached drawings in which.

Figure 1:
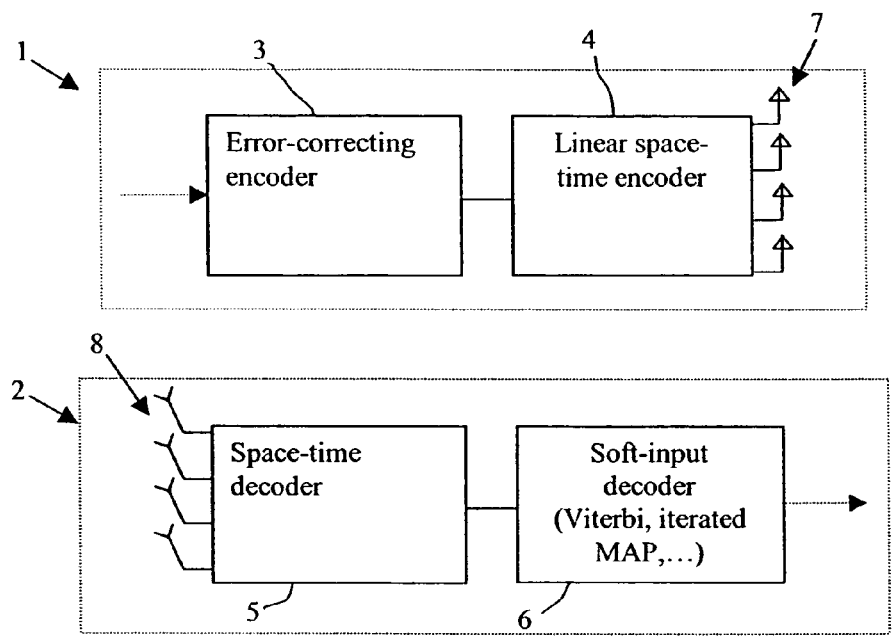
FIG. 1 is a diagram illustrating some elements of a transmission system within a transmitter and a receiver, the space-time decoder according to the invention being integrated into the receiver.

FIG. 1 represents a transmitter 1 provided with a plurality of antennae 7. The transmitter 1 comprises in particular, upstream of the antennae, an error correcting encoder 3 followed by a linear space-time encoder 4. According to an advantageous characteristic of the invention, the decoder according to the invention is capable of being applied to any linear space-time code, i.e. codes such as the sequences transmitted are written as a linear combination of the information symbols.

The signals transmitted by the antennae 7 are picked up by a plurality of antennae 8 within a receiver 2. The signals received undergo processing within a space-time decoder 5 according to the invention in order to estimate the information symbols of the signals transmitted. The space-time decoder 5 has a soft output to which a soft-input decoder is connected, for decoding error correcting codes such as convolutional codes, turbo-codes, Reed-Solomon codes etc.; the decoding being able to be carried out by a Viterbi algorithm, a MAP (maximum a posteriori) algorithm or iterated LOG-MAP etc.

Figure 2:
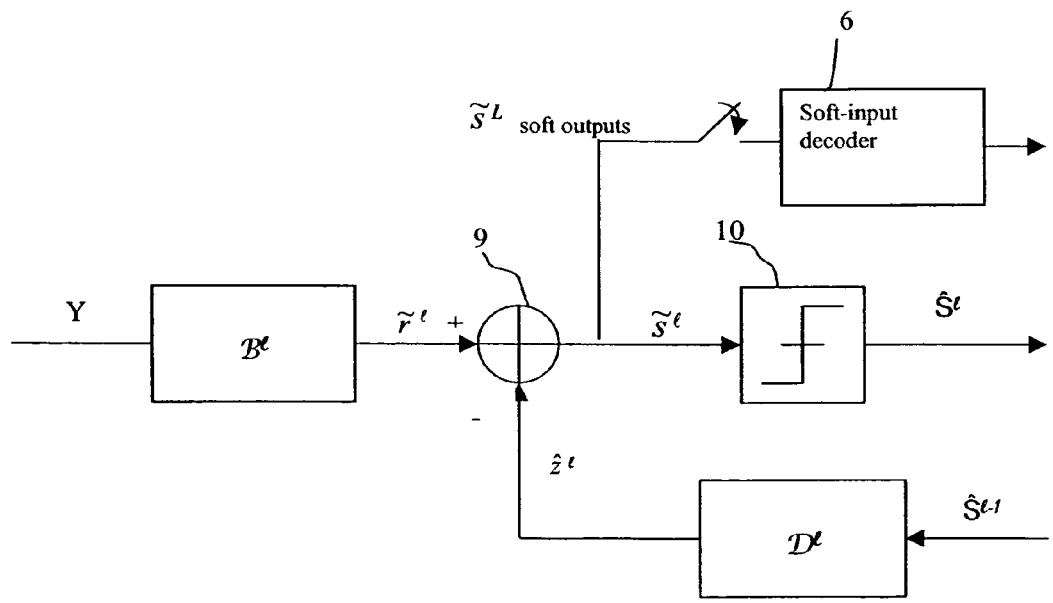
FIG. 2 is a general diagram illustrating the architecture of the space-time decoder according to the invention.

FIG. 2 illustrates a general diagram of the architecture of the space-time decoder according to the invention. This decoder implements an iterative method making it possible to determine the information symbols S following a firm decision generated by a threshold detector 10. However, the space-time decoder according to the invention also generates information symbols following a soft decision capable of being injected into the soft input decoder 6, the injected signal being the signal obtained during the last iteration. The architecture of the decoder according to the invention chiefly involves two modules B and D injecting their output signals into a subtractor 9. The subtractor 9 generates an information symbol vector following a soft decision, these symbols being then detected by the threshold detector 10 in order to obtain symbols estimated by firm decision.

The two modules B and D represent matrix products of their input signals by the matrices $B^l$ and $D^l$, the index l expressing the iteration in progress. The module B receives at its input the signal Y from the antennae 8. The product of the matrix BL and Y is a signal $\tilde{r}^l$ from which is subtracted the signal $\hat{z}^l$ from the matrix product of the matrix $D^l$ and the signal $s^{l-1}$. The matrices $B^l$ and $D^l$ are such that: by taking up the notations in FIG. 2, we arrive at:

$$\tilde{r}^l = B^l \cdot Y$$

$$\tilde{s}^l = \tilde{r}^l - \hat{z}^l$$

$$\hat{z}^l = D^l \cdot \hat{s}^{l-1}$$

Noting that in the detection of the symbol $s_i$ of the vector s, the $i^{th}$ component of $\hat{z}^l$ must not be subtracted from $\tilde{r}^l$, the following constraint is imposed on $D^l$:

$$D_{ii}^l = 0, \forall 1 \leq i \leq n$$

i.e. a zero diagonal in order not to subtract the useful signal.

The detector generates the firm decision $\hat{s}^l$ from $\tilde{s}^l$ which is expressed in the iteration 1 by:

$$\tilde{s}^l = B^l \cdot Y - D^l \cdot \hat{s}^{l-1} = B^l \cdot (H \cdot s + w) - D^l \cdot \hat{s}^{l-1}$$

The first step to be implemented in the iterative decoder consists of determining the matrices $B^l$ and $D^l$ such that the mean quadratic error at the threshold detector input is as small as possible. It is defined at iteration 1 by the quantity:

$$MSE^l(B^l, D^l) = \|\tilde{s}^l - s\|^2$$

Minimizing the following expression means that $B^l$ and $D^l$ verify $$\frac{\partial MSE^l(B^l, D^l)}{\partial B^l} = \frac{\partial MSE^l(B^l, D^l)}{\partial D^l} = 0$$

The solving of these equations makes it possible to obtain, at iteration 1 as a function of the iteration 1-1, the following matrices $B^l$ and $D^l$:

$$B^l = Diag\left(\frac{1}{\rho_{l-1}^2 A_i^l + \frac{N_0}{E_s}}\right) 1 \leq i \leq MT \cdot C^H V^l$$

$$D^l = B^l \cdot C \cdot \rho_{l-1} - Diag\left(\frac{1}{\rho_{l-1}^2 A_i^l + \frac{N_0}{E_s}}\right) 1 \leq i \leq MT$$

With:

$$V^l = \left[\frac{1-\rho_{l-1}^2}{\frac{N_0}{E_s}} \cdot C \cdot C^H + Id_N\right]^{-1}$$

and $$A^l = \text{diag}(C^H \cdot V^l \cdot C);$$

where $E_s$ is the mean energy of the QAM constellation and $N_0$ is the noise variance.

The form of the matrix $D^l$ is intuitively satisfactory. In fact, if $\hat{s}^{l-1} = s$ such that $\rho^{l-1} = 1$, then the $D^l$ output reproduces the inter-symbol component for each symbol $s_i$, $\forall 1 \leq i \leq M$.

In a more general manner, $\rho^{l-1} = 1$ indicates the confidence there is in the quality of the estimated $\hat{s}^{l-1}$. If $\hat{s}^{l-1}$ is not reliable then $\rho^{l-1} = 1$ will be low and consequently a lower weighting will be applied to the estimator of the inter-symbol interference subtracted from $\tilde{r}^l$. On the other hand, if $\hat{s}^{l-1}$ is an excellent estimate of s, then $\rho_s^{l-1} \rightarrow 1$ and almost all the inter-symbol interference is subtracted from $\tilde{r}^l$. It should also be noted that at the first passage l=1, $\rho_s^{l-1} = \rho_s^0 = 0$ and as there is no estimated $\hat{s}^{l-1} = \hat{s}^0$ still available, $B^l$ is the adapted filter.

In these equations, $\rho^l$ designates the value, at iteration l, of the correlation between the symbols detected at iteration l, $\hat{S}_k^l$ and the symbols actually transmitted. This correlation is therefore $$\rho^l = \frac{E(S_k \hat{s}_k^l)}{E_s}$$

where $E_s$ is the mean energy of a symbol

It can be noted that the matrices $B^l$ and $D^l$ have very different roles:

The matrix $B^l$ is a signal-formation matrix. At iteration zero, it is noted that $B^l$ is the linear decoder which minimizes the mean square error. When the correlation becomes great (tends towards 1), the role of the matrix $B^l$ becomes marginal.

The role of the matrix $D^l$ is to subtract from the current information symbol the interference due to the other information symbols. Its role is marginal at iteration zero, but as confidence in the detected symbols $\hat{s}^l$ grows, its role becomes determinant.

A means of estimating the correlation coefficient will now be described.

Calculation of the correlation $$\rho^l = \frac{E(S_k \hat{s}_k^l)}{E_s}$$

requires calculation of the signal to interference ratio at iteration 1, $SINR^l$. This signal to interference noise ratio is first calculated as a function of the correlation at the preceding step 1-1.

1. Calculation of $SINR^l$

It is shown that:

$$SINR^l = \left[\frac{1}{\xi^l \cdot e^{\xi^l} \cdot E_1(\xi^l)} - 1\right] \cdot \frac{1}{(1-(\rho^{l-1})^2)}$$

with $$\frac{1}{\xi^l} = \frac{1-(\rho_s^{l-1})^2}{\zeta}; \frac{1}{\zeta} = \frac{N \cdot E_s}{N_0} = \frac{N}{M \cdot N_0}$$

$$\text{and } E_1(s) = \int_s^{+\infty} \frac{e^{-t}}{t} dt,$$

the integral exponential.

2. Calculation of $\rho^l$

The calculation of $\rho^l$ is done in several steps:

a—Let $\rho^0 = 0$ and l=1 b—Calculate the signal to interference (+noise) ratio at the threshold detector input using the formula:

$$SINR^l = \left[\frac{1}{\xi^l \cdot e^{\xi^l} \cdot E_1(\xi^l)} - 1\right] \cdot \frac{1}{(1-(\rho^{l-1})^2)}$$

c—Calculate the symbol error probability Pr at the threshold detector input from the $SINR^l$ assuming that the total noise is Gaussian and using the formula corresponding to the constellation, for example in the case of an m-PSK type modulation, the following formula can be used:

$$Pr = 2 \cdot Q\left(\sin\left(\frac{\pi}{m}\right) \cdot \sqrt{2 \cdot SINR^l}\right).$$

This calculation results from an approximation to a strong signal to noise ratio for the symbol error probabilities of the m-PSK modulations associated with a threshold detector symbol by symbol in the presence of an additive white Gaussian noise type channel. This approximation is linked to the definition of the equivalent model.

d—Calculate the expression of $\rho^l$ at the subtractor output assuming that when there is an error, then the threshold detector detects one of the closest neighbours to the symbol transmitted. In the case of an m-PSK, this results in:

$$\rho^l \approx 1 - 2 \cdot \sin^2\left(\frac{\pi}{m}\right) \cdot Pr$$

e—Increment l (l=l+1) and return to step b.

As seen in FIG. 2, the architecture of the decoder according to the invention shows soft decisions at the output of the subtractor 9. These decisions are exploited at the final iteration. They can be injected into a soft input decoder 6.

By calling the final iteration L, it is possible to approximate $\tilde{s}^L$ by the following equation:

$$\tilde{s}^L = K \, S + \text{noise}$$

Where constant K>0 is known and S is the column vector of the symbols with MT components.

If the soft or weighted input decoder is a Viterbi algorithm, it will only have to minimize the euclidian distance between $\tilde{s}^L$ and KS on all the error-correcting code words.

Figure 3:
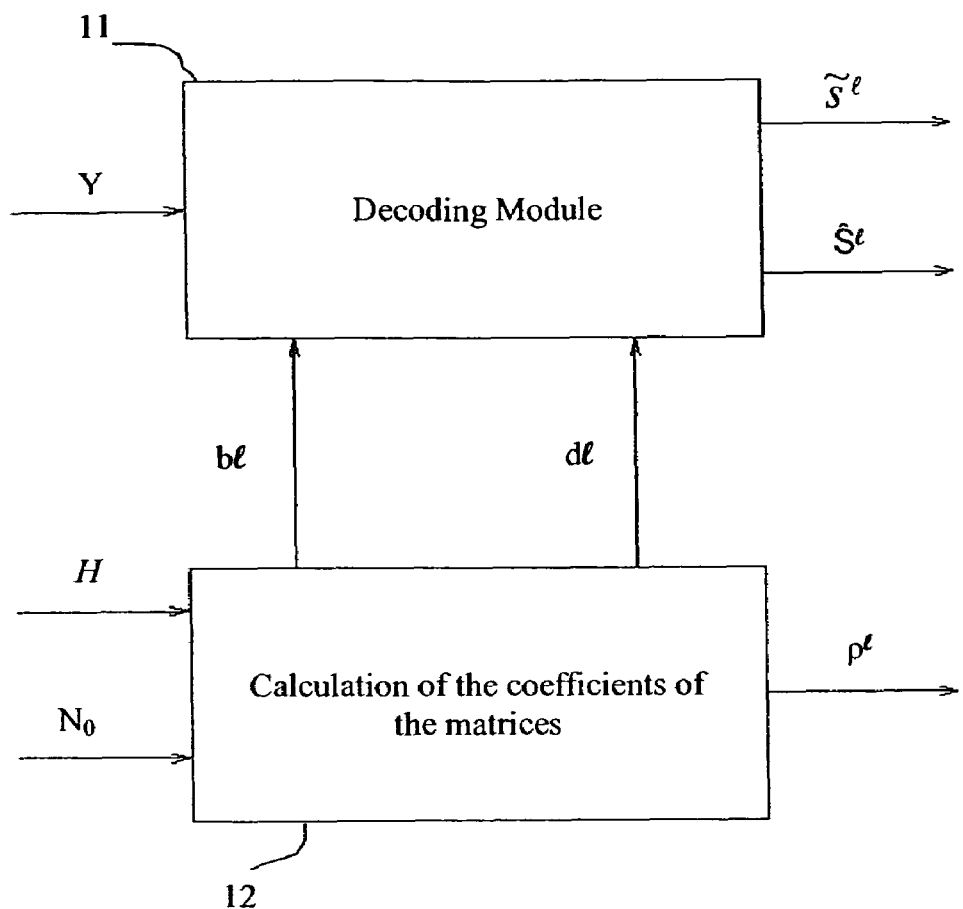
FIG. 3 is a general block diagram according to the invention.

FIG. 3 shows a general block diagram of the decoder according to the invention. The decoding module 11 comprises the elements B, D, 9 and 10 of FIG. 2. In fact the vector Y at the input, and a soft output $\tilde{s}^L$ (output of the subtractor 9) as well as the output $\hat{s}^l$ (output of the threshold detector 10) are found. It shows a module 12 for calculation of the coefficients of the matrices B and D. This module 12 makes it possible to calculate, at each iteration or overall before the start of the iterations, the correlation coefficient and the coefficients bl and dl of the matrices B and D. This module 12 receives at the input the matrix H (estimation of the transmission channel) and the variance $N_0$. It can generate at the output the correlation coefficient which can be used to interrupt the iterations or for any other use.

Of course the invention is not limited to the examples which have just been described and numerous of adjustments can be to these examples without going beyond the scope of the invention.

The invention claimed is:

1. An iterative method for decoding a signal vector Y obtained from N sampled signals in a space-time communication system with M transmission antennae and N receiving antennae, with N and M being integers and N greater than or equal to M, with a view to obtaining an estimation of symbols of signals transmitted; characterized in that each iteration comprises the following steps:

Pre-processing of the vector Y in order to maximize a signal to noise+interference ratio in order to obtain a signal $\tilde{r}^l$, Subtraction from the signal $\tilde{r}^l$ of a signal $\hat{z}^l$ by means of a subtractor, the signal $\hat{z}^l$ being obtained by reconstruction post-processing of an interference between symbols of an iteration in progress from symbols estimated during a preceding iteration, Detection of a signal generated by the subtractor in order to obtain, for the iteration in progress, an estimation of the symbols of the signals transmitted;

and in that, the N signals being processed by time intervals T corresponding to a time length of a linear space-time code associated with the signals transmitted, the pre-processing step utilizes a matrix B in order to maximize the signal to noise+interference ratio, a transfer function of which is:

$$B^l = \text{Diag}\left(\frac{1}{\rho_{l-1}^2 A_i^l + \frac{N_0}{E_s}}\right) 1 \leq i \leq MT \cdot C^H V^l$$

with $V^l = \left[\dfrac{1-\rho_{l-1}^2}{\dfrac{N_0}{E_s}} \cdot C \cdot C^H + Id_N\right]^{-1}$ ; $A^l = \text{diag}(C^H \cdot V^l \cdot C)$;

wherein $\Lambda$: iteration index; $\rho$: standardized correlation coefficient between real symbols and estimated symbols; $N_0$: noise variance; Es: mean energy of a symbol; C: extended channel matrix; $Id_N$: identity matrix of size N; $C^H$: conjugate transpose of C; i: index ranging from 1 to MT;

and in that a post-processing step involves a matrix D for the reconstruction of the interference between symbols, a transfer function of which is:

$$D^l = B^l \cdot C \cdot \rho_{l-1} - \text{Diag}\left(\frac{1}{\rho_{l-1}^2 A_i^l + \frac{N_0}{E_s}}\right) 1 \leq i \leq MT.$$

2. The method according to claim 1, wherein the pre-processing step is carried out by operating a matrix multiplication between the signal vector Y and a matrix B, the matrix B being updated at each iteration.

3. The method according to claim 1, wherein the post-processing step is carried out by operating a matrix multiplication between the estimation of the symbols of the signals transmitted during the preceding iteration and the matrix D, the matrix D being updated at each iteration.

4. The method according to claim 2, wherein for each iteration, the standardized correlation coefficient $\rho$ is calculated and the matrix B is updated, the updating of the matrix B being achieved by determining new coefficients of the matrix B as a function of the correlation coefficient obtained for a preceding iteration.

5. The method according to claim 1, wherein in order to determine the correlation coefficient $\rho^l$ for each iteration:
the signal to noise+interference ratio SINR for each iteration is calculated using the following formula:

$$SINR^l = \left[\frac{1}{\xi^l e^{\xi^l} E_1(\xi^l)} - 1\right]\frac{1}{1-\rho_{l-1}^2}$$

and defining the integral exponential $$E_1(s) = \int_s^{+\infty} \frac{e^{-t}}{t} dt \text{ with } \xi^l = \frac{\varsigma}{1-\rho_{l-1}^2} \text{ and } \varsigma = \frac{N_0}{NE_s}$$

with $\xi^l = \varsigma/1-\rho_{l-1}^2$ and $\varsigma = N_0/NE_S$
a symbol error probability Pr is calculated from the signal to noise+interference ratio $SINR^l$ for each iteration; and
the correlation coefficient $\rho^l$ for each iteration is then calculated from the respective symbol error probability Pr for the given iteration.

6. The method according to claim 5, wherein it is assumed that $\rho^0=0$.

7. The method according to claim 5, wherein in order to calculate the symbol error probability Pr it is assumed that the total noise is Gaussian.

8. The method according to claim 7, wherein, in obtaining an estimation of the symbols of the signals transmitted, a formula corresponding to a constellation originating from a linear modulation transmission technique is used.

9. The method according to claim 5, wherein in order to calculate the correlation coefficient $\rho^l$ for each iteration using its respective symbol error probability Pr, it is assumed that when there is an error, a threshold detector detects one of among closest neighbors to a symbol transmitted.

10. The method according to claim 1, wherein at a final iteration, a signal leaving the subtractor is introduced into a soft-input decoder.

11. The method according to claim 1, wherein information symbols of the N sampled signals are elements of a constellation originating from quadrature amplitude modulation.

12. A space-time decoder for decoding a signal vector Y obtained from N sampled signals in a space-time communication system with M transmission antennae and N receiving antennae, with N and M being integers and N greater than or equal to M, with a view to obtaining an estimation of symbols of signals transmitted, characterized in that it comprises:

a pre-processing module of the vector Y for maximizing a signal to noise+interference ratio in order to obtain a signal $\tilde{r}^l$, a post-processing module for reconstruction of an interference between symbols from symbols estimated during a preceding iteration in order to generate the signal $\hat{z}^l$, a subtractor for subtracting a signal $\hat{z}^l$ from the signal $\tilde{r}^l$, a threshold detector for detecting a signal generated by the subtractor in order to obtain, for an iteration in progress, an estimation of the symbols of the signals transmitted;

and in that the N sampled signals being processed by intervals of time T corresponding to a time length of a linear space-time code associated with the signals transmitted, the pre-processing module utilizes a matrix B for maximizing the signal to noise+interference ratio, a transfer function of which is:

$$B^l = \text{Diag}\left(\frac{1}{\rho_{l-1}^2 A_i^l + \frac{N_0}{E_S}}\right) 1 \leq i \leq MT \cdot C^H V^l$$

$$\text{with } V^l = \left[\frac{1-\rho_{l-1}^2}{\frac{N_0}{E_S}} \cdot C \cdot C^H + Id_N\right]^{-1}; A^l = \text{diag}(C^H \cdot V^l \cdot C);$$

wherein l: iteration index; $\rho$: standardized correlation coefficient between the real symbols and the estimated symbols; $N_0$: noise variance; Es: mean energy of a symbol; C: extended channel matrix; $Id_N$: identity matrix of size N; $C^H$: conjugate transpose of C; i: index ranging from 1 to MT;

and in that the post-processing module consists of a matrix D for the reconstruction of the interference between symbols, a transfer function of which is:

$$D^l = B^l \cdot C \cdot \rho_{l-1} - \text{Diag}\left(\frac{1}{\rho_{l-1}^2 A_i^l + \frac{N_0}{E_S}}\right) 1 \leq i \leq MT.$$

13. The decoder according to claim 12, wherein it further comprises a soft input decoder receiving the signal generated from the subtractor during a final iteration.

* * * * *